(12) United States Patent
Hirota et al.

(10) Patent No.: US 11,529,921 B2
(45) Date of Patent: Dec. 20, 2022

(54) STEERING WHEEL

(71) Applicants: Autoliv Development AB, Vargarda (SE); Yutaka Hirota, Kanagawa (JP); Keisuke Honma, Kanagawa (JP); Hiroyoshi Shimono, Kanagawa (JP)

(72) Inventors: Yutaka Hirota, Kanagawa (JP); Keisuke Honma, Kanagawa (JP); Hiroyoshi Shimono, Kanagawa (JP)

(73) Assignee: Autoliv Development AB, Vargarda (SE)

(*) Notice: Subject to any disclaimer, the term of this patent is extended or adjusted under 35 U.S.C. 154(b) by 211 days.

(21) Appl. No.: 16/960,597

(22) PCT Filed: Jan. 2, 2019

(86) PCT No.: PCT/JP2019/000004
§ 371 (c)(1),
(2) Date: Jul. 8, 2020

(87) PCT Pub. No.: WO2019/142655
PCT Pub. Date: Jul. 25, 2019

(65) Prior Publication Data
US 2020/0346605 A1 Nov. 5, 2020

(30) Foreign Application Priority Data
Jan. 19, 2018 (JP) .............................. JP2018-007736

(51) Int. Cl.
*B60R 21/203* (2006.01)
*B62D 1/08* (2006.01)
(52) U.S. Cl.
CPC ............ *B60R 21/2037* (2013.01); *B62D 1/08* (2013.01)

(58) Field of Classification Search
CPC ............ B60R 21/2037; B60R 21/2035; B60R 21/203; B62D 1/10; B62D 1/11; B62D 1/06
See application file for complete search history.

(56) References Cited

U.S. PATENT DOCUMENTS 8,459,686 B2  6/2013  Suzuki et al.
2009/0218739 A1  9/2009  Terada et al.
(Continued)

FOREIGN PATENT DOCUMENTS

JP      2009-202859 A    9/2009
JP      2010-69934 A     4/2010
(Continued)

OTHER PUBLICATIONS

International Search Report of the International Searching Authority for PCT/JP2019/000004 dated Mar. 12, 2019.
(Continued)

*Primary Examiner* — Brian J McGovern
(74) *Attorney, Agent, or Firm* — Foley & Lardner LLP

(57) ABSTRACT

[Problem] To provide a steering wheel including a damper unit with an excellent vibration absorbing effect.
[Resolution Means] The steering wheel according to the present invention includes: a cored bar member; an airbag module which houses an airbag cushion and an inflator and is coupled to the cored bar member; and a damper unit arranged between the cored bar member and the airbag module. Here, the damper unit includes: a buffer member including an elastic material; an upper support member supporting the buffer member from above; and a lower support member supporting the buffer member from below. Moreover, the buffer member includes a laterally protruding flange part configured so as to be sandwiched between the upper support member and the lower support member. In
(Continued)

addition, a gap is formed between the flange and at least one of the upper support member or the lower support member.

11 Claims, 12 Drawing Sheets

(56) References Cited

U.S. PATENT DOCUMENTS

| | | |
|---|---|---|
| 2010/0066062 A1 | 3/2010 | Suzuki et al. |
| 2014/0131982 A1 | 5/2014 | Ishii et al. |
| 2015/0042079 A1 | 2/2015 | Ishii et al. |
| 2018/0029556 A1* | 2/2018 | Ishii .................... B60R 21/2037 |

FOREIGN PATENT DOCUMENTS

| | | |
|---|---|---|
| JP | 2014-111426 A | 6/2014 |
| JP | 2015-036278 A | 2/2015 |
| JP | 2016-064808 A | 4/2016 |
| JP | 2017-197185 A | 11/2017 |

OTHER PUBLICATIONS

English translation of International Search Report of the International Searching Authority for PCT/JP2019/000004 dated Mar. 12, 2019.

* cited by examiner

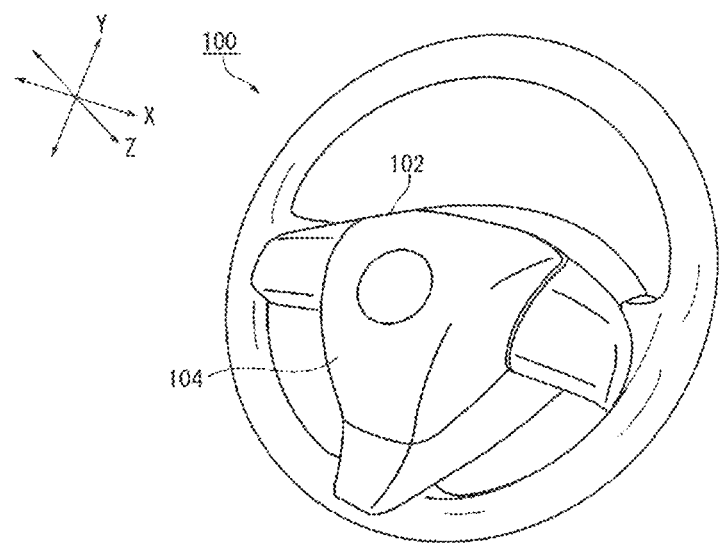
(a)
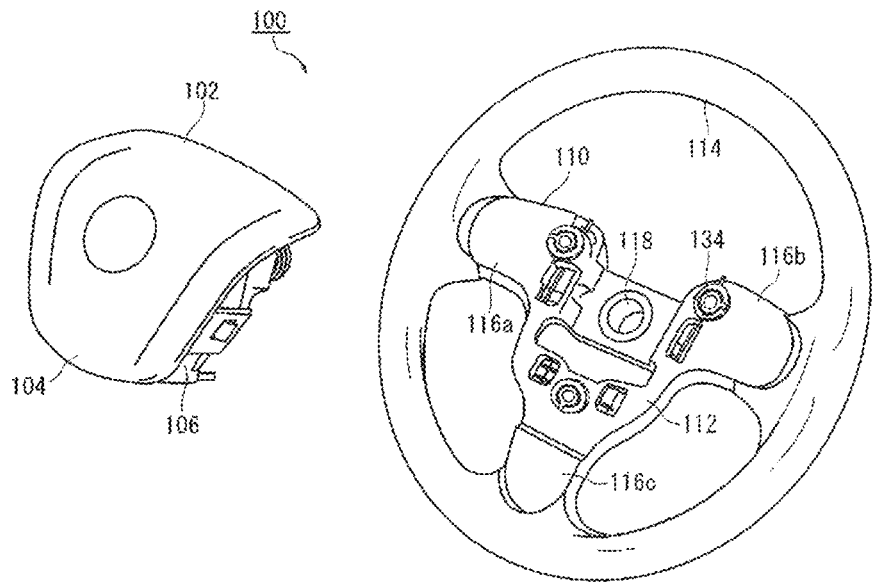
(b)
FIG. 1

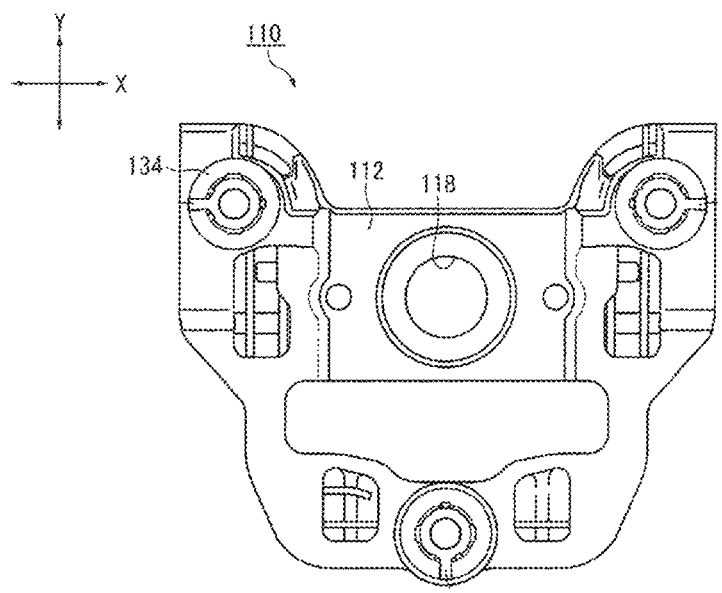
(a)
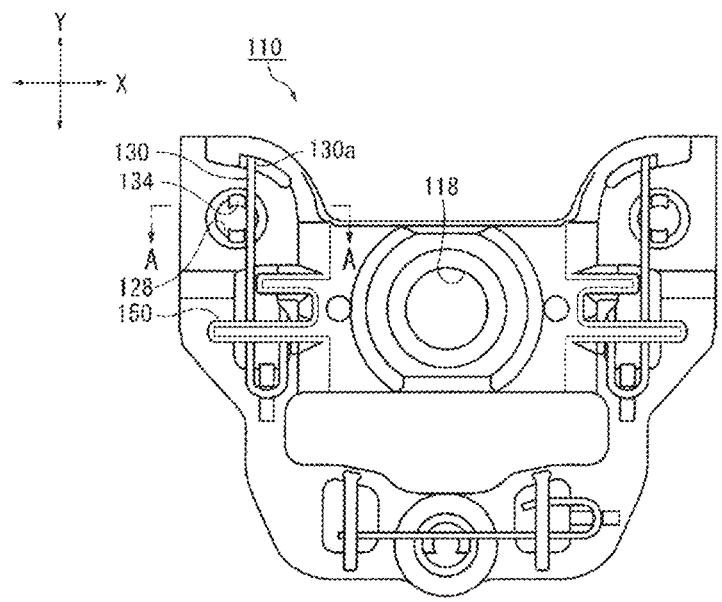
(b)
FIG. 3

(A)
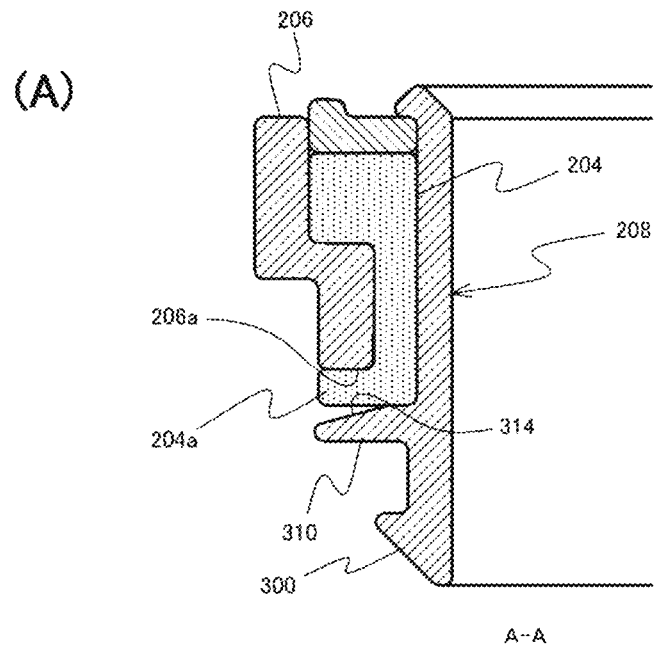
A–A
(B)
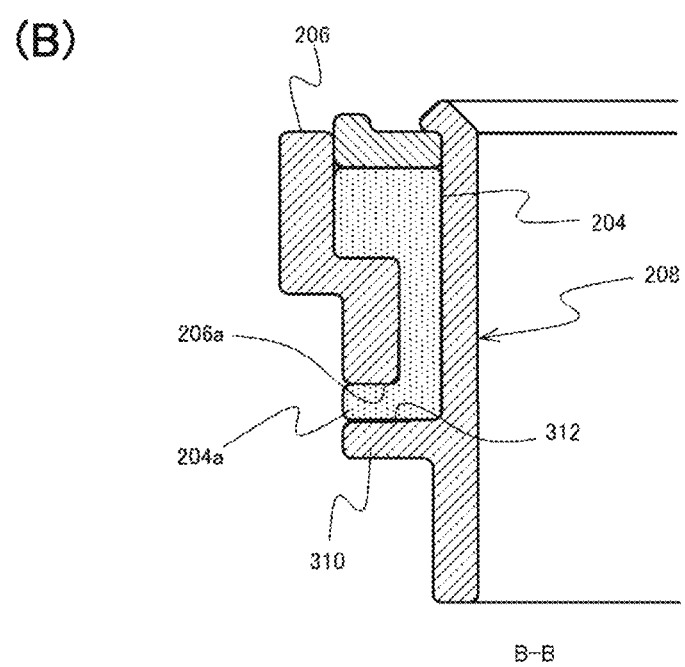
B–B
FIG. 10

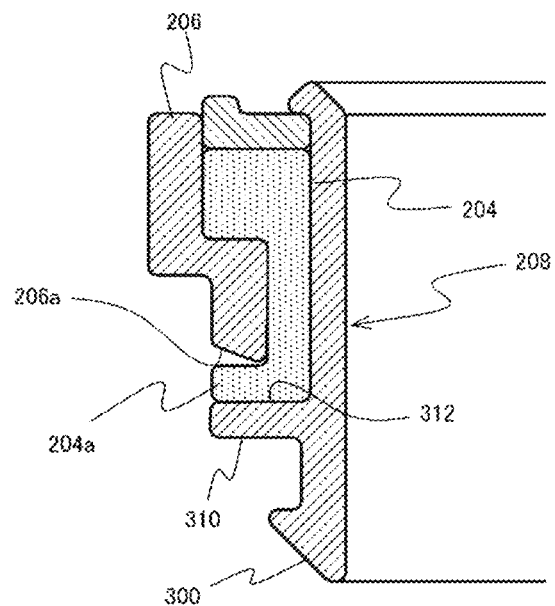
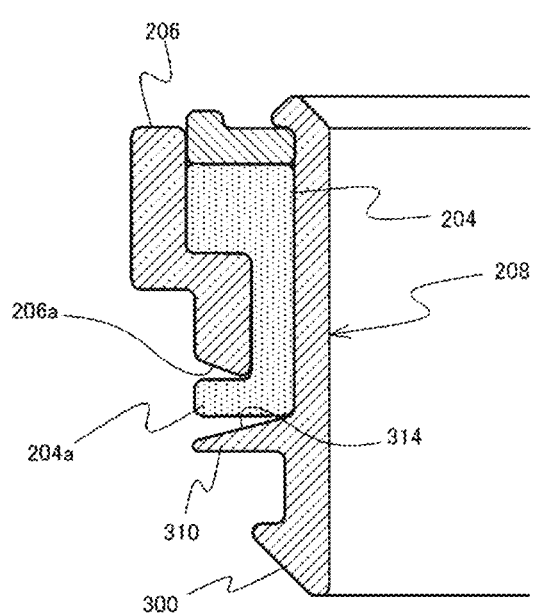
FIG. 11

STEERING WHEEL

TECHNICAL FIELD

The present invention relates to a steering wheel of an automobile and specifically relates to a steering wheel structure including a so-called floating airbag module.

BACKGROUND

In many cases, recent vehicles include a front airbag apparatus provided in the middle on the passenger side of a steering wheel. A front airbag is deployed by expansion gas so as to protect a passenger from a collision in the forward direction. The front airbag is housed in a housing together with an inflator for supplying gas and attached to the steering wheel as an integral airbag module. Such an airbag module is held while floating from a cored bar of the steering wheel (floating structure), moved in the cored bar direction (when a passenger pushes the airbag module to operate a horn), and utilized as a horn switch (for example, Patent Document 1).

The airbag module of Patent Document 1 employs a snap fit structure, allowing it to be simply attached to a cored bar member serving as the base of the steering wheel. The snap fit structure is generally the structure for bonding (coupling) utilizing the elasticity of members. In addition, only when a pin provided in the airbag module is inserted into the cored bar member, can it be coupled to a clip (rod-shaped spring) at the back of the cored bar member and attached thereto.

A coil spring is provided outside the pin attached to the bottom of the airbag module so as to bias the airbag module upward (passenger side) without operating the horn. In addition, upon operating the horn, the airbag module is pushed against the repulsion of the coil spring. Note that a groove is formed at the tip of the pin, which is hooked by the abovementioned clip and coupled thereto.

The abovementioned pin and coil spring configure a portion of a damper unit. For example, three damper units are attached to the airbag module. For example, a rubber buffer member for vibration absorption, in addition to the pin and the coil spring, may be provided in each damper unit. The buffer member is arranged on the periphery of the pin so as to be sandwiched between the upper and lower members. Unfortunately, the vibration absorbing effect using the buffer member has been insufficient. In particular, a buffer effect against large vibrations and swing involving swinging to the center axis of the pin has been insufficient.

RELATED ART DOCUMENTS

Patent Documents

[Patent Document 1] JP 2010-69934 A

DISCLOSURE OF THE INVENTION

Problem to be Solved by the Invention

The present invention has been created in view of the abovementioned problems, with the object of providing a steering wheel including a damper unit with an excellent vibration absorbing effect.

Means for Solving the Problem

The steering wheel according to the present invention includes: a cored bar member; an airbag module which houses an airbag cushion and an inflator and is coupled to the cored bar member; and a damper unit arranged between the cored bar member and the airbag module. Here, the damper unit includes: a buffer member including an elastic material; an upper support member supporting the buffer member from above; and a lower support member supporting the buffer member from below. Moreover, the buffer member includes a laterally protruding flange part configured so as to be sandwiched between the upper support member and the lower support member. In addition, a gap is formed between the flange and at least one of the upper support member or the lower support member.

When the gap is formed between the flange of the buffer member and at least one of the upper support member or the lower support member, the degree of freedom in which this flange part is deformed can increase, thereby improving vibration absorbing (damping) performance.

The gap can be molded by a notch formed in the upper support member and/or the lower support member.

The notch can be formed as an inclined part so as be gradually separated from the flange towards the outside with respect to the surface orthogonal to the surface in the axial direction of the pin.

The notch can be minimally formed at four positions on the periphery of the flange.

The notch can be formed in either one or both of the lower support member and the upper support member. When the notch is formed both above and below the buffer member, the degree of deformation freedom of this buffer member advantageously increases.

When the notch formed in the upper support member and the notch formed in the lower support member are disposed so as to face each other via the flange, vibrations can be effectively absorbed in the region where these notches are formed.

On the other hand, the notch formed in the upper support member and the notch formed in the lower support member can be disposed so as not to face each other via the flange. For example, the upper notch and the lower notch can be alternately disposed and formed in the circumferential direction.

BRIEF DESCRIPTION OF THE DRAWINGS

FIG. 1 is a perspective view schematically illustrating a steering wheel apparatus applicable to the present invention, wherein (a) illustrates the appearance when equipped with an airbag module, while (b) illustrates the state prior to assembling the airbag module.

FIG. 3 is a plan view illustrating a portion (boss region) of a cored bar member of the steering wheel, wherein (a) is the state when viewed from the surface (airbag module side, passenger side), while (b) is the state when viewed from the back (steering column side).

FIG. 10 is a cross sectional view illustrating a portion of the structure of the damper unit according to an example of the present invention, wherein (A) illustrates a cross section (partially omitted) taken along A-A in FIG. 8, while (B) illustrates a cross section (partially omitted) taken along B-B in FIG. 9.

FIGS. 11(a) and 11(b) are cross sectional views each illustrating a portion of the structure of a damper unit according to another example of the present invention.

DESCRIPTION OF THE PREFERRED EMBODIMENT

Figure 2:
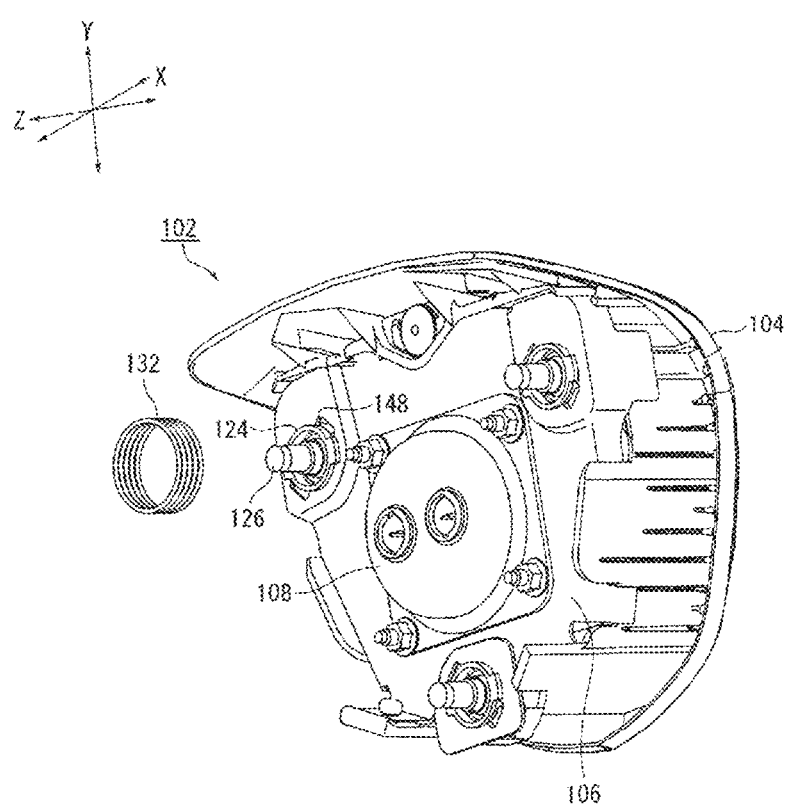
FIG. 2 is a perspective view observed from the back side of the airbag module illustrated in FIG. 1(b).

Examples according to the present invention will hereinafter be described in detail with reference to the appended drawings. Note that in the present specification and drawings, elements having substantially identical functions and configurations are labeled with identical symbols in order to omit redundant descriptions along with the illustration of elements not directly related to the present invention.

While the present invention is not limited thereto, one example of the structure in which a damper unit is provided on the airbag module side is illustrated in examples described below. For example, application is possible in a structure in which the damper unit is provided on the cored bar side, as well as in a structure which is provided at a position not clearly belonging to either the airbag module or the cored bar. Moreover, the structure may be one where the horn mechanism is completed on the cored bar side, or a structure completed on the airbag module side. Moreover, the coupling between the airbag module and the cored bar is not particularly limited.

In the following description and drawings, the rotation axis of the steering column is the Z axis, while the surface vertical to this Z axis is the XY plane. Note that the XY plane is often the plane parallel to a rim part. The "rotation direction" denotes the direction in which the rim part (gripping part) rotates about the boss center in the XY plane.

FIG. 1 is a view schematically illustrating a steering wheel apparatus (steering wheel 100) according to an example of the present invention. FIG. 1(a) illustrates the entire steering wheel 100. Incidentally, in the following drawings including FIG. 1(a), directions are illustrated under the assumption that the steering position of the steering wheel 100 attached to the vehicle is in a neutral position. For example, the Z axis is set to have a downward side in the front wheel direction of a vehicle on the steering column (steering shaft) (not illustrated) and an upward side in the direction toward the steering wheel 100. In addition, in the plane orthogonal to the Z axis, the X axis is set from the 9 o'clock direction (left direction) towards the 3 o'clock direction (right direction), while the Y axis is set from the 6 o'clock direction (rear direction) towards the 12 o'clock direction (forward direction), with the 12 o'clock position of an analog 12-hour clock as the front side of a vehicle. Alternatively, the side viewed from the side of a passenger is referred to as the front side, while the opposite side thereof is referred to as the back side.

The steering wheel 100 is installed at the driver seat of a vehicle so as to be connected to the steering shaft that penetrates inside the steering column (not illustrated) and transmits the operation force of a driver to the steering gear or the like. An airbag module 102 that functions as a front airbag in an emergency is attached at the center of the steering wheel 100. This airbag module 102 also functions as a horn switch that a passenger pushes to ring a horn in normal situations.

FIG. 1(b) is an exploded view of the steering wheel apparatus 100 in FIG. 1(a). As illustrated in FIG. 1(b), the airbag module 102 on the side of a passenger is covered with a resin cover 104 which functions as a design surface. A box-shaped housing 106 is provided below a cover 104, such that an airbag cushion (not illustrated) is folded and housed thereinside so as to be expanded and deployed in the event of an emergency. An inflator 108 (see FIG. 2), which is a gas generator, is also provided within the housing 106. When a signal is transmitted from the sensor of a vehicle in an emergency, gas is supplied from the inflator 108 to the airbag cushion, causing the airbag cushion to tear open the cover in order to expand and be deployed in the vehicle interior space and restrain a passenger.

A base part of the steering wheel 100 is configured of a metal cored bar member 110. The cored bar member 110 is largely configured to include a central boss region 112, a circular rim 114 that a passenger grips, and spokes 116a to 116c that connect the boss region 112 and the rim 114. A shaft hole 118 coupled to a steering shaft is provided in the boss region 112.

The airbag module 102 of the present example functions as a horn switch as described above and further as a module damper mechanism that dampens vibrations, in addition to functioning as a front airbag. Configurational elements that realize the function as a horn switch and a module damper mechanism will be described below in detail.

FIG. 2 is a view illustrating the back of the airbag module 102 in FIG. 1(b). As illustrated in FIG. 2, multiple damper units 124 are provided on the rear surface 120 of the housing 106. The damper unit 124 is a member that elastically attaches the housing 106 to the cored bar member 110 (see FIG. 1(b)) and is central to the module damper mechanism. In the present example, the damper unit 124 is provided at a total of three positions, consisting of: both end sides in the X axis direction at the back of the housing 106; and the rear side thereof in the Y axis direction.

Note that while the number and arrangement of the damper units 124 are only one example, the number and arrangement may be freely defined in the arrangement symmetric to the Y axis. For example, each damper unit 124 may be symmetrically arranged along the Y axis (or the X axis). Moreover, at the center of the airbag module 102 in the X axis direction, the damper unit 124 may be arranged at two positions in total, the upper and lower parts in the Y axis direction. In addition, each damper unit 124 may be geometrically and unsymmetrically arranged taking into consideration the balance of performance requirements (damping performance and horn switch performance) of all arranged damper units.

The rod-shaped pin 126 protrudes from the damper unit 124 towards the boss region 112 (see FIG. 1(b)) of the cored bar member 110 disposed below in the Z-axis direction. This pin 126 is inserted into a bearing hole 128 via a collar member 134 (see FIG. 3) of the cored bar member 110 and coupled to the below-mentioned rod-shaped spring 130 installed on the back side of the cored bar member 110. The coupling between this pin 126 and the spring 130 attaches the airbag module 102 to a cored bar member 120.

FIG. 3 is a view illustrating the boss region 112 of the core mold member 110 in FIG. 1(*b*). FIG. 3(*a*) illustrates the state when the core metal member 110 is viewed from the airbag module 102 side, while FIG. 3(*b*) illustrates the state when viewed from the back side of the core mold member 110 in FIG. 4(*a*). As illustrated in FIG. 3(*a*), three collar members 134 into which the pins 126 of the damper units 124 are inserted are provided in the core metal member 110. Each of these collar members 134 is attached to each bearing hole into which the pin 126 (see FIG. 2) is inserted.

In the present embodiment, as illustrated in FIG. 3(*b*), a rod-shaped spring (omega spring) 130 is provided below each bearing hole. The rod-shaped spring 130 is a spring element which supports the pin 126. The rod-shaped spring 130 has a bent shape of an elongated metal rod. The rod-shaped spring 130 is supported and installed by a rib 150, etc., however, one end thereof is a free end 130*a* with no support which may potentially warp. When the pin 126 engages with the free end 130*a* of this rod-shaped spring 130, the airbag module 102 is detachably attached onto the cored bar member 110.

The pin 126 is inserted into the core metal member 110 through a first spring 132 and the collar member 134 (see FIG. 1(*b*)). The first spring 132 is a coil shaped, functioning as a so-called horn spring, and is installed between the airbag module 102 and the cored bar member 110 so as to ensure a gap therebetween. Hence, the airbag module 2 released from being pushed down by a passenger during a horn operation is separated from the cored bar member 110 to return to the original position thereof.

Figure 4:
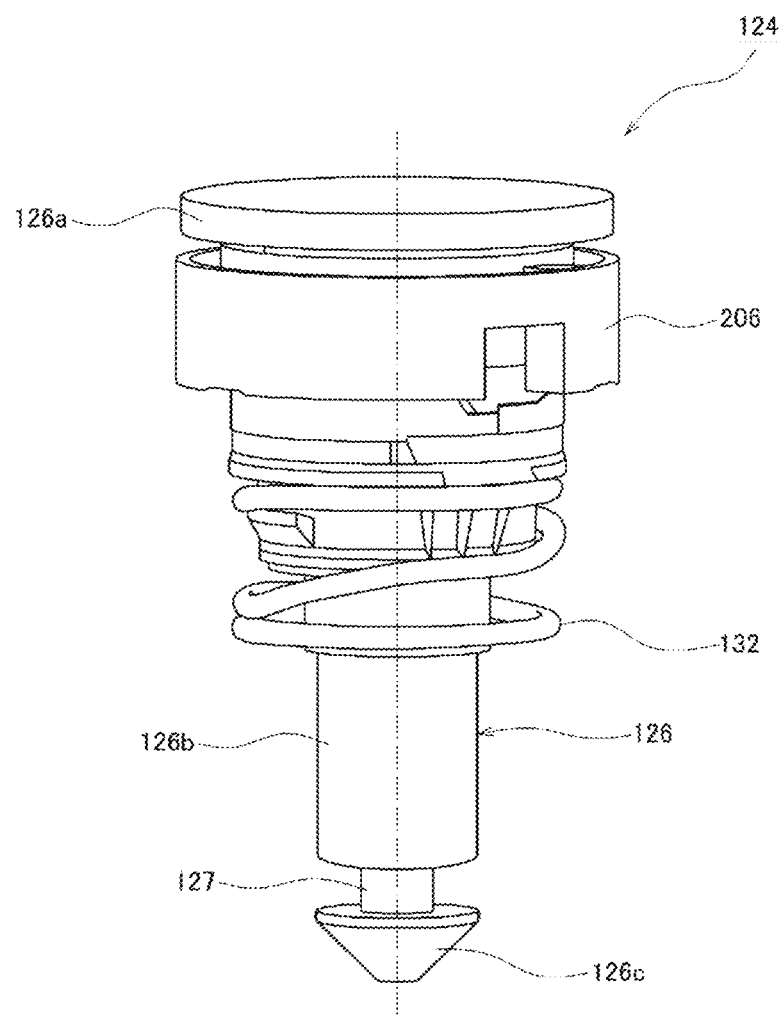
FIG. 4 is a perspective view illustrating a damper unit used in an airbag apparatus according to an example of the present invention.
Figure 5:
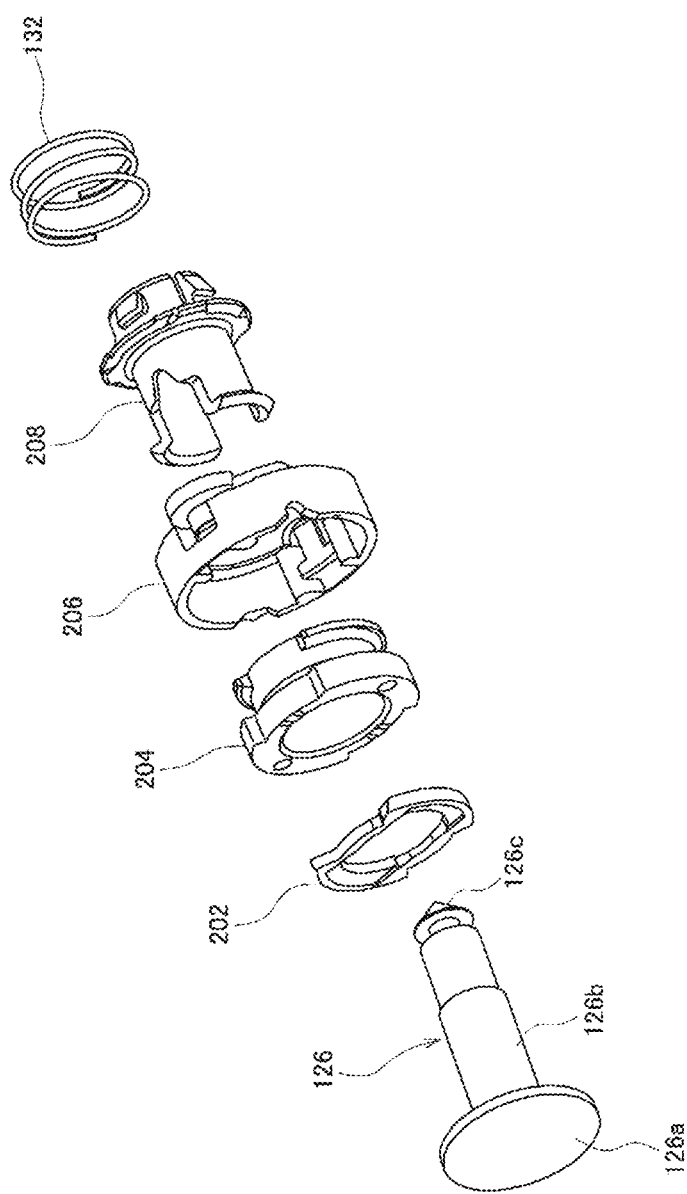
FIG. 5 is an exploded perspective view of the damper unit illustrated in FIG. 4.

FIG. 4 is a perspective view illustrating the damper unit 124 used in the airbag apparatus according to the present invention. FIG. 5 is an exploded perspective view of the damper unit 124 illustrated in FIG. 4. The damper unit 124 includes, in addition to the abovementioned damper pin 126: a rubber holder plate 202; a rubber member (buffer member) 204 having elastic force; a rubber holder (upper support member) 206 holding the rubber member 204; and a support member (lower support member) 208 which is molded from an insulating material so as to hold the upper end of the coil spring 132.

These components 202, 204, 206, and 208 are concentrically arranged with the pin 126. The pin 126 includes a disc-shaped upper end 126*a*, a cylindrical main body part 126*b*, and a tip part 126*c* with a groove 127 formed on the periphery thereof.

Figure 6:
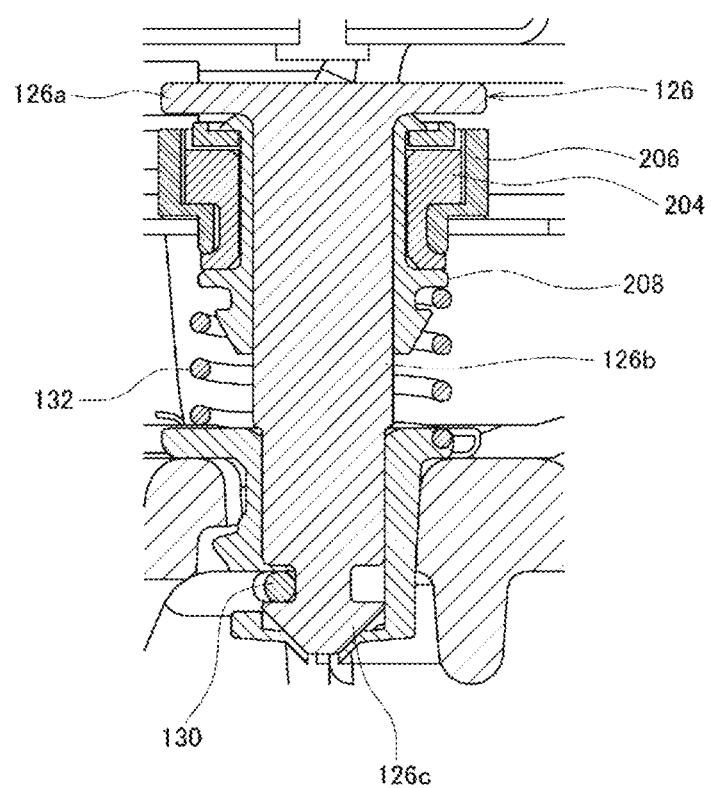
FIG. 6 illustrates the state in which the damper unit illustrated in FIGS. 4 and 5 is inserted into a bearing hole of the cored bar member, corresponding to a cross section taken along A-A in FIG. 3(b).

The damper unit 124 and the peripheral structure thereof described above will hereinafter be described in further detail with reference to FIG. 6. FIG. 6 is a view corresponding to the A-A cross section in the bearing hole 128 of the cored bar member 110 in FIG. 3(*b*). This FIG. 6 illustrates the cross section including the X axis and the Y axis in the damper unit 124 coupled to the cored bar member 110.

As illustrated in FIG. 6, when the pin 126 of the damper unit 124 is coupled to the rod-shaped spring 130 on the cored bar member 110 side, the airbag module 102 is attached to the cored bar member 110. At this time, the pin 126 passes inside the coil spring 132, with this coil spring 132 arranged between the airbag module 102 and the cored bar member 110. The airbag module 102 is supported by the coil spring 132, thereby functioning as a horn switch.

The collar member 134 supports the side of the pin 126 inside the bearing hole 128. If the collar member 134 is installed, the pin 126 can be supported at a higher position than the case of the cored bar member 110 alone, making it possible to further enhance the uprightness of the pin 126.

In the abovementioned configuration, when the airbag module 102 is attached to the cored bar member 110, in a simple snap fit only involving inserting the pin 126 into the cored bar member 110, the airbag module 102 is attached to the cored bar member 110 so as to function as the horn switch.

As mentioned above, in the steering wheel 100 in the present example, the damper unit 124 exerts multiple functions as a contact point when operating a horn, and acts as an element (vibration damping) elastically supporting the airbag module 102 in a vibration damping mechanism. Consequently, another member does not have to be provided for each function, enabling a simplified configuration.

In the present example, the airbag module 102 attached to the cored bar member 110 by a snap fit structure can also be removed from the cored bar member 110 via a relatively simple operation. If the airbag module 102 is removed, the rod-shaped spring 130 is warped from the back of the cored bar member 110 using a designated tool so as to decouple the pin 126 and the rod-shaped spring 130. At this time, a structure facilitating the operation is provided in the cored bar member 110 according to the present example.

The coil spring 132 is configured such that the upper end thereof is supported by a support member 208. The support member 208 includes a hook 300 (see FIG. 7) which is provided at four positions at equal intervals within the face vertical to the axial direction of the damper pin 126 in order to support the upper end part of the coil spring 132.

Figure 7A:
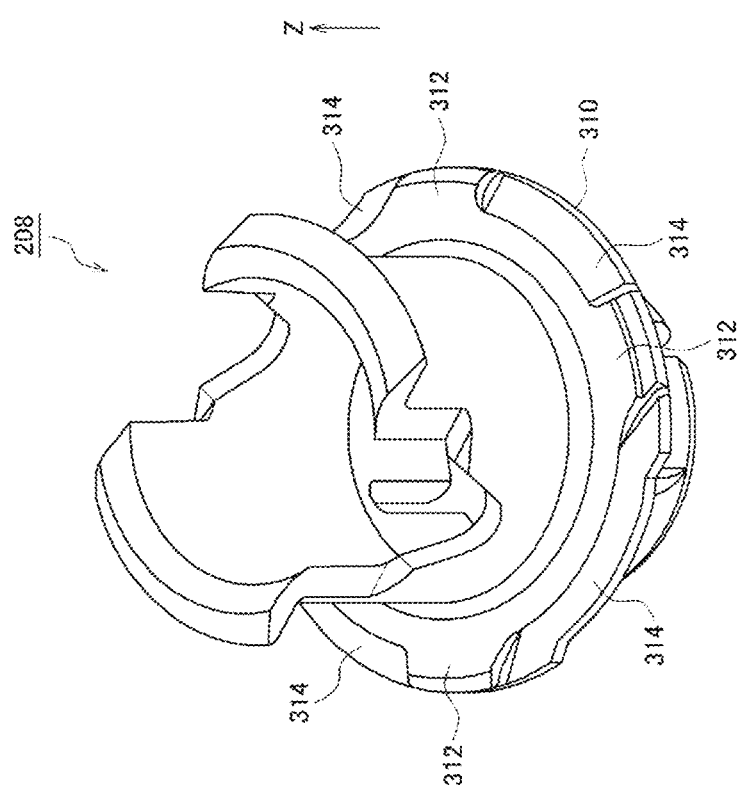
FIG. 7A is a perspective view illustrating the structure of a portion (spring holding member) of the damper unit according to an example of the present invention, illustrating the state when viewed from below (cored bar side).
Figure 7B:
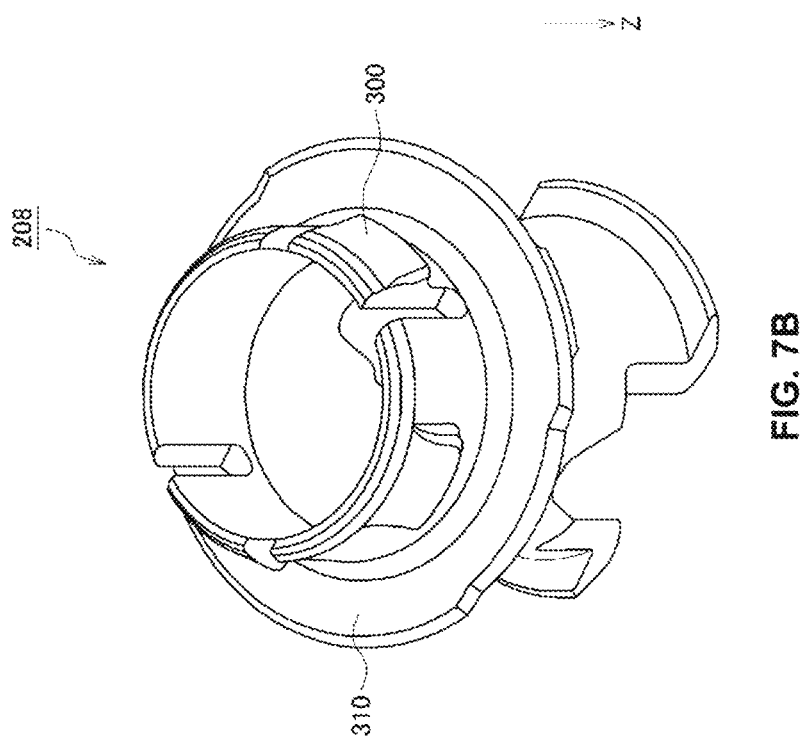
FIG. 7B is a perspective view illustrating the structure of a portion (spring holding member) of the damper unit according to an example of the present invention, illustrating the state when viewed from above.
Figure 8:
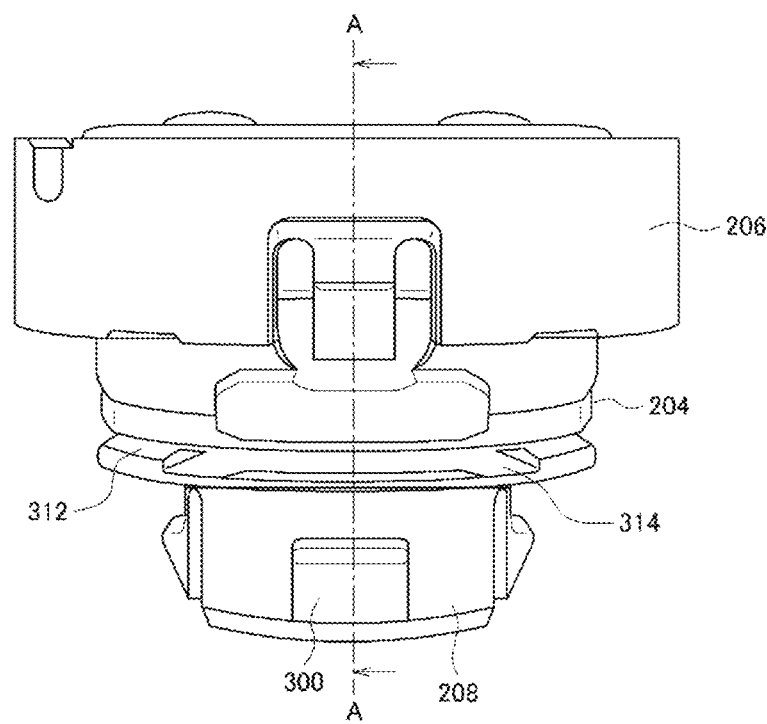
FIG. 8 is a perspective view illustrating a portion of the structure of the damper unit according to an embodiment of the present invention.
Figure 9:
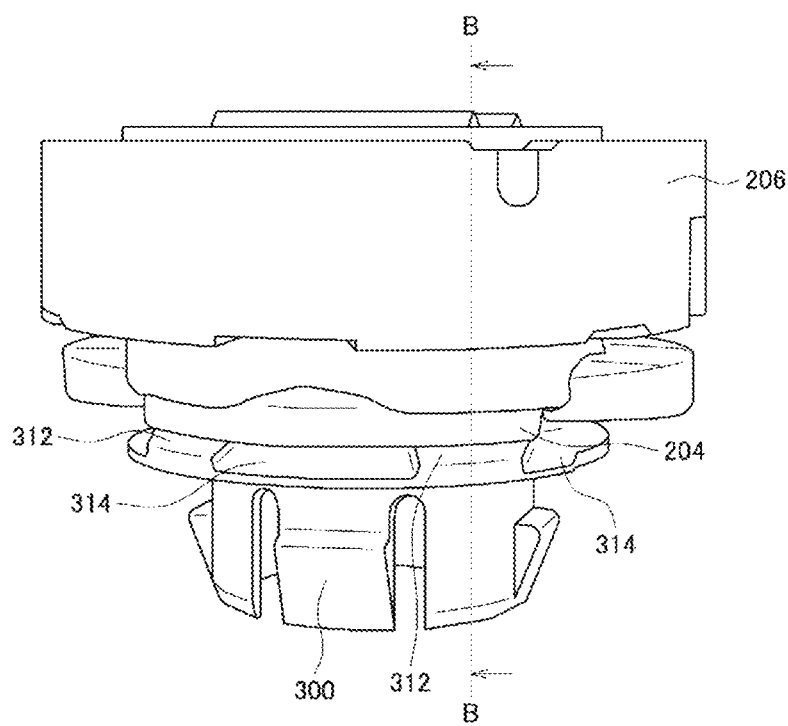
FIG. 9 is a perspective view illustrating a portion of the structure of the damper unit according to an embodiment of the present invention, with the angle observed with respect to FIG. 8 changed.

FIGS. 7A, 7B are perspective views each illustrating the structure of a portion (spring holding member 208) of the damper unit 124, illustrating the state when viewed from below (cored bar 110 side) (FIG. 7A), while illustrating the state when viewed from above (FIG. 7B). FIGS. 8 and 9 are perspective views each illustrating the structure of the spring holding member 208, illustrating the state when observed from each different angle. FIG. 10(A) illustrates a cross section (partially omitted) taken along A-A in FIG. 8, while FIG. 10(B) illustrates a cross section (partially omitted) taken along B-B in FIG. 9.

The rubber member 204 includes a flange part 204*a* vertically protruding to the Z axis. The flange part 204*a* is sandwiched between the upper surface (312, 314) of a flange 310 of the spring holding member 208 and the bottom 206*a* of the rubber holder 206.

The holding member 208 includes the flange 310 supporting the bottom of the rubber member 204. The flange 310 includes: a flat region 312 substantially vertically extending to the axis (Z axis) of the pin 126; and an inclined region 314 inclined below the outside of the surface vertical to the Z axis. The inclined region 314 is obtained by notching a portion of the flange 310 so as to form a gap with the flange part 204*a* of the rubber member 204. Note that the flat region 312 and the inclined region 314 are alternately arranged and formed in the circumferential direction.

FIGS. 11(A), (B) are cross sectional views each illustrating a portion of the structure of a damper unit according to another embodiment of the present invention, illustrating a cross section taken along A-A in FIG. 8 as in FIG. 10(A). In the example of FIG. 11(A), when no notch is present on the spring holding member 208 side, but a notch (inclined part) 206*a* is formed on the rubber holder 206 side, the gap is formed with the flange part 204*a* of rubber member 204.

Moreover, the example of FIG. 11(B) combines FIGS. 10(A) and 11(A), wherein the notches (inclined parts) 314, 206*a* are formed in both the spring holding member 208 and the rubber holder 206 so as to form a gap on both upper and lower sides.

As described above, when a notch is provided in either one or both of the rubber holder 206 and the holding member 208 vertically holding the rubber member 204, and the damper unit 124 generates vibrations which are not parallel or vertical to the Z axis, that is, swinging, the swinging width as the damper unit 124 can increase, thereby effectively absorbing these vibrations. As in the present invention, a notch (gap) is not present and the vertically sandwiched flange part 204*a* of the rubber member 204 is only vertically compressed, making it impossible to exert a sufficient vibration absorbing effect.

While examples of the present invention have been described thus far, the present invention is not limited by these examples and may be modified as long as such modification is included in the category of technical ideas described in the Scope of the Patent Claims.

The invention claimed is:

1. A steering wheel, comprising:
    a cored bar member;
    an airbag module which houses an airbag cushion and an inflator and is coupled to the cored bar member; and
    a damper unit arranged between the cored bar member and the airbag module; wherein:
    the damper unit comprises: a buffer member including an elastic material; an upper support member supporting the buffer member from above; and a lower support member supporting the buffer member from below,
    the buffer member includes a laterally protruding flange part which is configured so as to be sandwiched between the upper support member and the lower support member,
    wherein at least one of the upper support member and the lower support member includes a plurality of notches disposed about a periphery thereof, the plurality of notches forming a plurality of gaps with the flange part.

2. The steering wheel according to claim 1, wherein:
    the damper unit further comprises a pin penetrating through a central part of the damper unit,
    the buffer member, the upper support member, and the lower support member are configured so as to be arranged outside the pin, and
    the flange part of the buffer member protrudes in the direction orthogonal to the axial direction of the pin.

3. The steering wheel according to claim 1, wherein the plurality of notches are formed as inclined parts so as to be increasingly separated from the flange part.

4. The steering wheel according to claim 1, wherein the plurality of notches are minimally formed at four positions.

5. The steering wheel according to claim 1, wherein the plurality of notches are only formed in the lower support member.

6. The steering wheel according to claim 1, wherein the plurality of notches are only formed in the upper support member.

7. The steering wheel according to claim 1, wherein the plurality of notches are formed in both the upper support member and the lower support member.

8. The steering wheel according to claim 7, wherein the plurality of notches formed in the upper support member and the plurality of notches formed in the lower support member are disposed so as to face each other via the flange part.

9. The steering wheel according to claim 7, wherein the plurality of notches formed in the upper support member and the plurality of notches formed in the lower support member are disposed so as not to face each other via the flange part.

10. The airbag module employed in the steering wheel according to claim 1.

11. The damper unit employed in the steering wheel according to claim 1.

* * * * *